US012636863B2

(12) United States Patent
Winterowd et al.

(10) Patent No.: US 12,636,863 B2
(45) Date of Patent: **\*May 26, 2026**

(54) COMPOSITE PANELS WITH ADHESIVE AND SEPARATE FRAGMENT LAYERS

(71) Applicant: Continuus Materials Intellectual Property, LLC, The Woodlands, TX (US)

(72) Inventors: Jack G. Winterowd, The Woodlands, TX (US); Matt Spencer, The Woodlands, TX (US); Marko Suput, The Woodlands, TX (US); Kasey Fisher, The Woodlands, TX (US); Allan Bradshaw, The Woodlands, TX (US)

(73) Assignee: Continuus Materials Intellectual Property, LLC, The Woodlands, TX (US)

( \* ) Notice: Subject to any disclaimer, the term of this patent is extended or adjusted under 35 U.S.C. 154(b) by 269 days.

This patent is subject to a terminal disclaimer.

(21) Appl. No.: 18/503,015

(22) Filed: Nov. 6, 2023

(65) Prior Publication Data

US 2024/0075721 A1     Mar. 7, 2024

Related U.S. Application Data

(63) Continuation-in-part of application No. 17/575,467, filed on Jan. 13, 2022, now Pat. No. 11,806,972.

(51) Int. Cl.
    *B32B 3/10*       (2006.01)
    *B32B 27/08*     (2006.01)
           (Continued)

(52) U.S. Cl.
    CPC .............. *B32B 27/08* (2013.01); *B32B 27/18* (2013.01); *B32B 27/304* (2013.01); *B32B 27/32* (2013.01);
           (Continued)

(58) Field of Classification Search
None
See application file for complete search history.

(56) References Cited

U.S. PATENT DOCUMENTS 8,322,639 B2   12/2012   Gitschel
8,394,505 B2    3/2013   Girstl
           (Continued)

FOREIGN PATENT DOCUMENTS

EP       3 838 589 A1    6/2021
EP       4 039 435 A1    8/2022

OTHER PUBLICATIONS

International Search Report and Written Opinion on Application No. PCT/US2024/054600, dated Apr. 1, 2025, (14 pg).

*Primary Examiner* — Christopher M Polley
(74) *Attorney, Agent, or Firm* — FOLEY & LARDNER LLP

(57) ABSTRACT

A panel including a first layer including fragments from a first blend of paper fragments of a first size and plastic fragments of a second size, a second layer including fragments from a second blend of paper fragments of a third size and plastic fragments of a fourth size, the third size being different from the first size, and the fourth size being different from the second size, and a third layer comprising fragments from the first blend. The second layer is disposed between the first layer and the third layer.

11 Claims, 5 Drawing Sheets

200

240
210
220
230
250

(51) Int. Cl.

| | |
|---|---|
| *B32B 27/18* | (2006.01) |
| *B32B 27/30* | (2006.01) |
| *B32B 27/32* | (2006.01) |
| *B32B 37/06* | (2006.01) |
| *B32B 37/10* | (2006.01) |

(52) U.S. Cl.
  CPC .............. *B32B 37/06* (2013.01); *B32B 37/10* (2013.01); *B32B 2250/40* (2013.01); *B32B 2264/0214* (2013.01); *B32B 2264/06* (2013.01); *B32B 2272/00* (2013.01); *B32B 2305/30* (2013.01); *B32B 2317/12* (2013.01); *B32B 2323/00* (2013.01); *B32B 2327/06* (2013.01); *B32B 2607/00* (2013.01)

(56) References Cited

U.S. PATENT DOCUMENTS

| | | | | |
|---|---|---|---|---|
| 8,398,006 | B2 | 3/2013 | Gitschel | |
| 9,126,204 | B1 | 9/2015 | Toberman et al. | |
| 9,649,666 | B2 | 5/2017 | Gitschel | |
| 10,227,778 | B2 * | 3/2019 | Schroeder | B27N 3/04 |
| 10,400,188 | B2 | 9/2019 | Toberman | |
| 10,538,716 | B1 | 1/2020 | Toberman et al. | |
| 10,731,346 | B2 * | 8/2020 | Kelly | B32B 27/283 |
| 10,793,798 | B2 | 10/2020 | Toberman | |
| 11,806,972 | B2 | 11/2023 | Winterowd et al. | |
| 2010/0092731 | A1 * | 4/2010 | Pervan | B32B 27/04 |
| | | | | 118/200 |
| 2022/0205774 | A1 | 6/2022 | Wan et al. | |
| 2023/0219333 | A1 | 7/2023 | Winterowd et al. | |

\* cited by examiner

100

110

120

130

300

| 310 | Shred paper and plastic fragments |
|---|---|
| 320 | Process paper and plastic fragments through one or more screens |
| 330 | Treat paper and plastic fragments |
| 340 | Dry paper and plastic fragments |
| 350 | Mix paper and plastic fragments |
| 360 | Coat paper and plastic fragments with an adhesive |
| 370 | Form paper and plastic fragments into a mat |
| 380 | Press the mat |

400

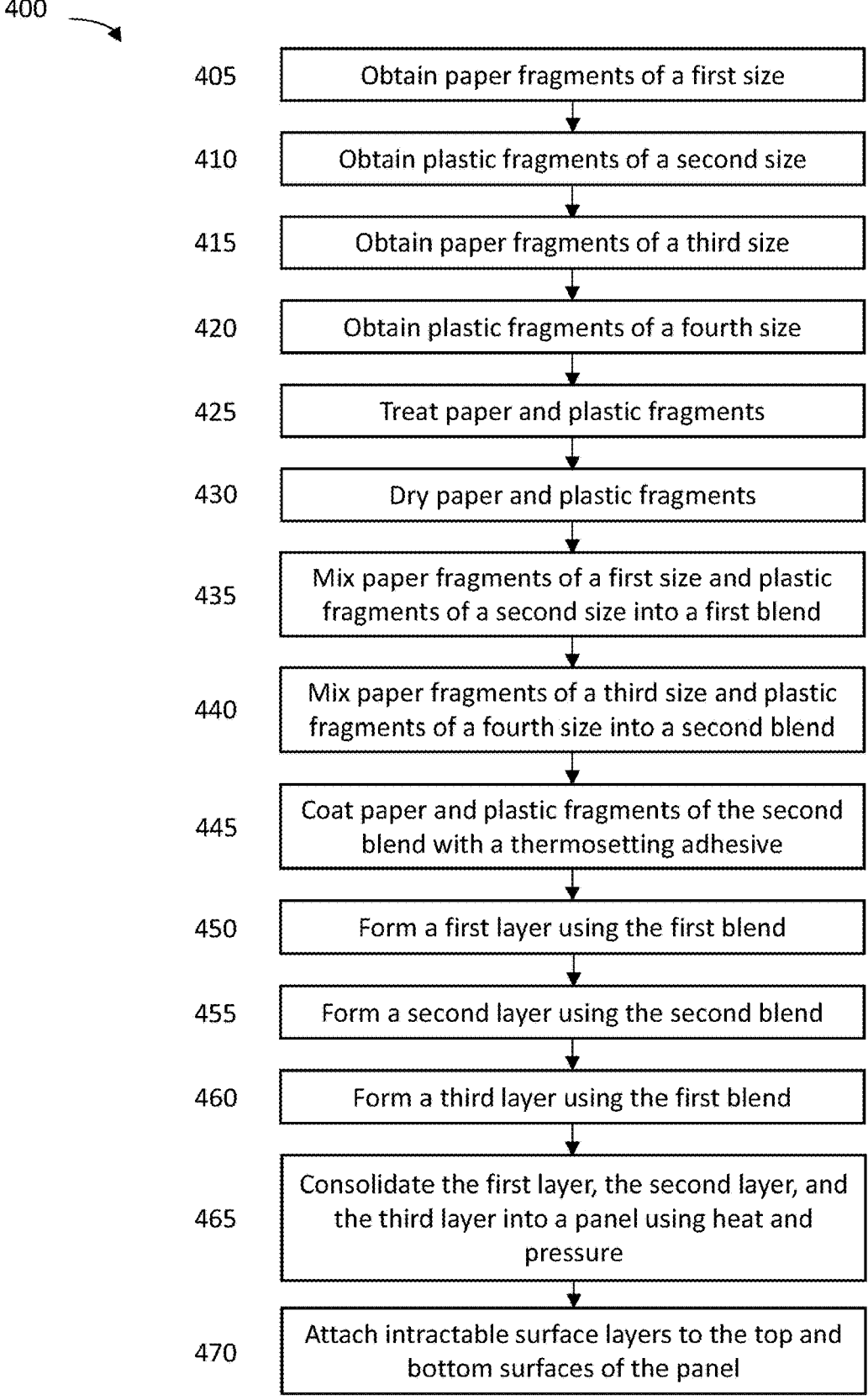

405    Obtain paper fragments of a first size

410    Obtain plastic fragments of a second size

415    Obtain paper fragments of a third size

420    Obtain plastic fragments of a fourth size

425    Treat paper and plastic fragments

430    Dry paper and plastic fragments

435    Mix paper fragments of a first size and plastic fragments of a second size into a first blend 440    Mix paper fragments of a third size and plastic fragments of a fourth size into a second blend 445    Coat paper and plastic fragments of the second blend with a thermosetting adhesive 450    Form a first layer using the first blend 455    Form a second layer using the second blend 460    Form a third layer using the first blend 465    Consolidate the first layer, the second layer, and the third layer into a panel using heat and pressure 470    Attach intractable surface layers to the top and bottom surfaces of the panel

FIG. 4

|  | Panel 3a | Panel 3b | Panel 2c |
|---|---|---|---|
| Fragment Architecture | None | Homogenous | Layered |
| Adhesive Type | None | Polyurethane | Polyurethane |
| Average Adhesive Level on Fragments | 0 | 5.00 | 4.25 |
| Separate Fragment Layers | No | No | Yes |
| Paper Fragment Level (%) | 70.0 | 70.0 | 74.0 |
| Plastic Fragment Level (%) | 30.0 | 30.0 | 26.0 |
| Treated Fragment Tack | Low | Medium | Medium |
| Panel Basis Weight (percent of control) | 100 | 100 | 106 |
| Panel Thickness (percent of control) | 100 | 96 | 93 |
| Hot Press Time (s) | 210 | 210 | 180 |
| Panel Density (percent of control) | 100 | 104 | 111 |
| Average MOE (percent of control) | 100 | 176 | 272 |
| Average MOR (percent of control) | 100 | 128 | 157 |
| Average IB (percent of control) | 100 | 119 | 110 |

COMPOSITE PANELS WITH ADHESIVE AND SEPARATE FRAGMENT LAYERS

CROSS-REFERENCE TO RELATED PATENT APPLICATIONS

This application is a continuation-in-part of U.S. application Ser. No. 17/575,467, filed on Jan. 13, 2022, which is incorporated by reference herein in its entirety.

BACKGROUND

Low slope commercial roofs are typically comprised of four essential layers. The base of the assembly is typically a fluted steel deck. Less frequently, oriented strand board (OSB), plywood, or concrete are used as decking. A rigid insulating foam board, such as polyisocyanurate foam board or expanded polystyrene, is installed directly over the deck. A protective cover board is positioned directly over the insulating foam and is typically secured with screws that extend through the insulating foam and into the deck. A water-resistant membrane is then installed over the protective cover board and is attached to the cover board with either adhesives or induction welding. Cover boards, and other building materials, can be manufactured from a variety of waste products including municipal solid waste (MSW), residuals from recycling centers, industrial waste, and other waste sources.

SUMMARY

Aspects of one embodiment of the present disclosure relate to a panel. The panel may include a first layer containing a first blend of paper fragments and plastic fragments; a second layer containing a second blend of paper fragments and plastic fragments, wherein the paper fragments and plastic fragments of the second blend are coated with an adhesive; and a third layer containing the first blend of paper fragments and plastic fragments, wherein the second layer is disposed between the first layer and the third layer, and wherein the first layer, the second layer, and the third layer are combined to form the panel using heat and pressure. In another embodiment, paper fragments and plastic fragments in the first and third layers are coated with an adhesive, while the fragments in the second layer are not.

Aspects of another embodiment of the present disclosure relate to a method for manufacturing a panel. The method may include obtaining paper fragments and plastic fragments; mixing the paper fragments and the plastic fragments into a first blend of paper and plastic fragments; mixing the paper fragments and the plastic fragments into a second blend of paper and plastic fragments; coating the paper fragments and the plastic fragments of the second blend with an adhesive; forming a mat comprising separate layers of the first blend and the second blend; and consolidating the mat using heat and pressure to form a panel. In one embodiment, a first layer comprises the first blend; a second layer comprises the second blend, and a third layer comprising the first blend. In an alternative embodiment, a first layer comprises the second blend; a second layer comprises the first blend, and a third layer comprising the second blend.

Aspects of another embodiment of the present disclosure relate to a panel including a first layer comprising fragments from a first blend of paper fragments of a first size and plastic fragments of a second size, a second layer including fragments from a second blend of paper fragments of a third size and plastic fragments of a fourth size, the third size being different from the first size, and the fourth size being different from the second size, and a third layer including fragments from the first blend. The second layer is disposed between the first layer and the third layer. In some embodiments, the first and third layers include a thermoplastic binder, which may include flexible polyvinyl chloride and/or thermoplastic polyolefin. In some embodiments, the second layer includes a thermosetting resin.

Aspects of another embodiment of the present disclosure relate to a method of manufacturing a panel. The method includes mixing paper fragments of a first size and the plastic fragments of a second size into a first blend of paper and plastic fragments, mixing paper fragments of a third size and plastic fragments of a fourth size into a second blend of paper and plastic fragments, the third size being different from the first size, and the fourth size being different from the second size, forming a first layer comprising fragments from the first blend, forming a second layer comprising fragments from the second blend, forming a third layer comprising fragments from the first blend, wherein the second layer is disposed between the first and third layers, and consolidating the first layer, the second layer, and the third layer into a panel using heat and pressure. In some embodiments, the fragments of the first and third layers are coated with a thermoplastic binder, which may include flexible polyvinyl chloride and/or thermoplastic polyolefin. In some embodiments, the fragments of the second layer are coated with a thermosetting resin.

Aspects of another embodiment of the present disclosure relate to a panel including aa first layer that includes fragments from a first blend of paper fragments and plastic fragments and a thermoplastic binder comprising at least one of flexible polyvinyl chloride or thermoplastic polyolefin. The panel further includes a second layer comprising fragments from a second blend of paper fragments and plastic fragments and a third layer comprising fragments from the first blend and a thermoplastic binder comprising at least one of flexible polyvinyl chloride or thermoplastic polyolefin. The second layer is disposed between the first layer and the third layer. In some embodiments, the second layer includes a thermosetting resin.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a flow diagram depicting operations in a panel manufacturing process, in accordance with another example embodiment.

FIG. 5 is a table comparing various example panels, in accordance with various embodiments.

DETAILED DESCRIPTION

The cover board and method of manufacturing thereof discussed herein have many advantages over conventional products and methods. The cover board may be manufactured from small, shredded pieces of recycled material, allowing for use of a greater variety of materials than conventional methods of manufacture that rely upon large, cohesive materials. This also allows for the physical characteristics of the cover board to be modified based on an intended application much more easily than conventional methods of manufacture. The cover board may include different layers of paper and plastic fragments resulting in greater strength and/or stiffness than conventional cover boards without layers of paper and plastic fragments. The cover board may also be manufactured using a hot-press process which is a simpler manufacturing process than conventional thermoplastic conversion processes that utilize injection molding, extrusion, thermoforming, or film-blowing. This process may also allow for the production of cover boards at a faster production rate and a lower overall manufacturing cost as compared to conventional production methods, especially when adhesives are used in the second fragment layer of the panel. This process may also allow for the production of cover boards at a much lower processing temperature than that associated with conventional methods. Use of an adhesive can also yield cover boards with higher strength, greater stiffness, and a lower coefficient of thermal expansion than conventional cover boards that are made without an adhesive in the second fragment layer of the panel.

Figure 1:
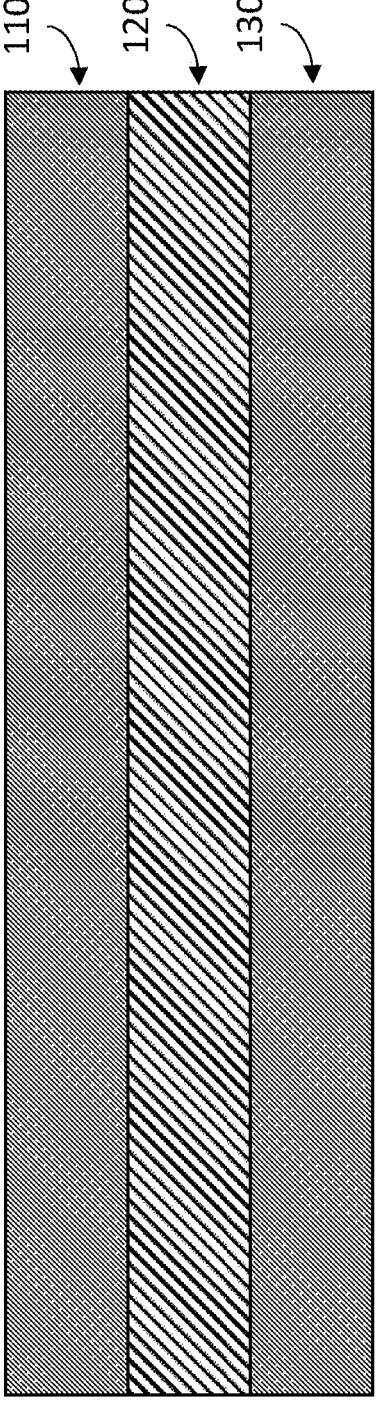
FIG. 1 is a side cutout view of an example panel according to an embodiment.

FIG. 1 is a side cutout view of an example panel 100. The panel 100 may include a first layer 110, a second layer 120, and a third layer 130. In some embodiments, the first layer 110 may be omitted. In other embodiments, the third layer 130 may be omitted. In yet other embodiments, the first layer 110 and third layer 130 may be omitted. The first layer 110 may include a first blend of paper and plastic fragments. The first blend may be a uniform mixing of paper and plastic fragments, a non-uniform mixing of paper and plastic fragments, or a specific arrangement of paper and plastic fragments. The second layer 120 may include a second blend of paper and plastic fragments coated with an adhesive. Similar to the first blend, the second blend may be a uniform mixing of paper and plastic fragments, a non-uniform mixing of paper and plastic fragments, or a specific arrangement of paper and plastic fragments. The third layer 130 may include a third blend of paper and plastic fragments. The third blend may be a uniform mixing of paper and plastic fragments, a non-uniform mixing of paper and plastic fragments, or a specific arrangement of paper and plastic fragments. The third blend may be the same as the first blend. In another embodiment, the first layer 110 and/or third layer 130 may include a second blend of paper and plastic fragments coated with an adhesive, while the second layer 120 is not coated with adhesive. The second layer 120 is disposed between first layer 110 and the third layer 130. The first layer 110 and third layer 130 may have the same thickness. The second layer 120 may have a thickness greater than that of the first layer 110 and/or the third layer 130. In other embodiments, the second layer 120 may have a thickness less than that of the first layer 110 and/or the third layer 130. In some embodiments the panel may have a length of about 8 feet, a width of about 4 feet, and a thickness of about 0.125-1.5 inches. In other embodiments, the composite might be cut into the shape of boards, such as boards having a dimension of 16 feet long, a width of 8 inches, and a thickness of about 0.5 inches.

Paper fragments of the first layer 110, second layer 120, or third layer 130 may include recycled materials. The paper may be recycled or sourced from waste streams. Use of recycled materials has the advantage of being low-cost. Also, diversion of the paper from landfills prevents the paper from being slowly decomposed and converted to greenhouse gases. Paper fragments may include newspaper, advertising, office paper, packaging, or other paper products. The paper fragments may be shredded fragments of larger recycled objects or materials. In some embodiments, the paper fragments may have a thickness of less than about 0.01 inches. In other embodiments, the paper fragments may have a thickness of less than about 0.002 inches.

Plastic fragments of the first layer 110, second layer 120, or third layer 130 may include recycled materials. The plastic fragments may include polypropylene, polystyrene, polyester, nylon, rubber (natural and synthetic), polyvinyl chloride (including flexible and rigid), polyethylene (including LLDPE, LDPE, MDPE, HDPE), copolymers of ethylene and propylene, and other commercial plastics. The plastic fragments may be a mixture of different types of polymers. The plastic fragments may include plasticizers, such as dioctyl phthalate or benzyl butyl phthalate, colorants, stabilizers, preservatives, and other functional additives. The plastic may be recycled or sourced from industrial waste streams which has the advantage of being low-cost. Also, diversion of the plastic from landfills prevents the plastic from being slowly decomposed and converted to greenhouse gases. The plastic may be sourced from plastic films, packaging, or other recyclable plastics. The plastic fragments may be shredded fragments of larger recycled objects or materials. In some embodiments the plastic fragments may have a thickness of less than about 0.01 inches. In other embodiments, the plastic fragments may have a thickness of less than about 0.002 inches.

In some embodiments, individual fragments of the first layer 110, second layer 120, and third layer 130 may include paper and plastic. In yet other embodiments, the individual fragments may include metal. For example, fragments may be sourced from packaging including many layers of paper and plastic. Shredding this packaging results in fragments containing both paper and plastic. Some packaging also includes a layer of aluminum foil or a film that has been metallized on one surface. Shredding this packaging results in discrete fragments that each contain paper layers, plastic layers, and one or more metal layers.

The first blend may represent a first paper/plastic ratio. In some embodiments, the paper fragments of the first blend may be 20-90% of the first blend by weight and the plastic fragments of the first blend may be 10-80% of the first blend by weight. In other embodiments the paper fragments of the first blend may be 45-65% of the first blend by weight and the plastic fragments of the first blend may be 35-55% of the first blend by weight. In yet other embodiments, the paper fragments of the first blend may be 75-80% of the first blend by weight and the plastic fragments of the first blend may be 20-25% of the first blend by weight. The first blend may be a homogenous mixture of paper and plastic fragments. In some embodiments, the first blend may include fragments that comprise alternating paper layers, plastic layers, and optionally metal layers.

The second blend may represent a second paper/plastic ratio. The second paper/plastic ratio may be the same as the first paper/plastic ratio or it may be different. In some embodiments, the paper fragments of the second blend may be 30-90% of the second blend by weight and the plastic fragments of the second blend may be 10-70% of the second blend by weight. In other embodiments the paper fragments of the second blend may be 50-75% of the second blend by weight and the plastic fragments of the second blend may be 30-55% of the second blend by weight. In yet other embodiments, the paper fragments of the second blend may be 75-80% of the second blend by weight and the plastic fragments of the second blend may be 20-25% of the second blend by weight. The second blend may be a homogenous mixture of paper and plastic fragments. In some embodiments, the second blend may include fragments that comprise alternating paper layers, plastic layers, and optionally metal layers.

In some embodiments, the paper and plastic fragments of the second layer 120 or of the second blend may be coated with an adhesive. The adhesive may be about 1-20% of the second layer 120 by weight. In some embodiments, the adhesive may be about 2-8% of the second layer 120 by weight. The adhesive may be a thermoplastic adhesive or a thermosetting adhesive. Thermosetting adhesives include isocyanates, polyurethanes, polyurea resins, phenolic resins, amino resins (including urea-formaldehyde resins, melamine-formaldehyde resins, or melamine-urea-formaldehyde resins), epoxy resins (including two-part liquid epoxy resins or one-part powdered epoxy resins), crosslinked polysaccharides, and resins based on soy and poly(amide epichlorohydrin) (PAE). Thermoplastic adhesives include latex emulsions, powdered polyethylene, powdered polypropylene, powdered copolymers of ethylene and propylene, powdered polystyrene, and other polymeric powders with a melt-point that is less than about 350° F. The adhesive used for coating the paper and plastic fragments of the second layer 120 may be selected based on an intended application of the panel or required physical attributes of the panel. For example, for a panel application requiring a stiff panel, a thermosetting adhesive with a high level of crosslinking will be useful to maximize the modulus of elasticity of the composite. In another example, a panel application requiring a high impact resistance, a thermosetting adhesive with a low level of crosslinking will be useful to improve the toughness of the panel and its ability to absorb and dissipate kinetic energy from an impact.

In some embodiments the paper and plastic fragments of the first layer 110 and/or the third layer 130 of the first blend may be coated with an adhesive. The adhesive may be about 1-20% of the first layer 110 or third layer 130 by weight. In some embodiments, the adhesive may be about 2-8% of the first layer 110 or third layer 130 by weight. The adhesive may be a thermoplastic adhesive (e.g., a thermoplastic binder) or a thermosetting adhesive (e.g., a thermosetting resin). Thermosetting adhesives include isocyanates, polyurethanes, polyurea resins, phenolic resins, amino resins (including urea-formaldehyde resins, melamine-formaldehyde resins, or melamine-urea-formaldehyde resins), epoxy resins (including two-part liquid epoxy resins or one-part powdered epoxy resins), crosslinked polysaccharides, or resins based on soy and poly(amide epichlorohydrin) (PAE). Thermoplastic adhesives include latex emulsions, powdered polyethylene, powdered polypropylene, powdered copolymers of ethylene and propylene, powdered polystyrene, and other polymeric powders with a melt-point that is less than about 350° F. The adhesive used for coating the paper and plastic fragments of the first layer 110 or the third layer 130 may be selected based on an intended application of the panel or required physical attributes of the panel. For example, for a panel application requiring a stiff panel, a thermosetting adhesive with a high level of crosslinking will be useful to maximize the modulus of elasticity of the composite. In another example, a panel application requiring a high impact resistance, a thermosetting adhesive with a low level of crosslinking will be useful to improve the toughness of the panel and its ability to absorb and dissipate kinetic energy from an impact.

In some embodiments, the first layer 110 and/or the third layer 130 may include a thermoplastic binder including flexible polyvinyl chloride (PVC), which may be new flexible PVC or recycled flexible PVC. Flexible PVC is a plastisol comprised of a mixture of PVC and plasticizer. The plasticizer in the flexible PVC can constitute about 10 to about 80 percent of the mixture. Flexible PVC is commonly used in flexible packaging, flexible hose, decorative flooring, electric cable insulation, and inflatable products. Flexible PVC may also be used as a water-resistant membrane in the upper layer of commercial roofs, including low-slope roofs. Bulk amounts of this material are often targeted for disposal when commercial roofs are replaced, about 20-30 years after installation. This flexible PVC can be recycled for use as a thermoplastic adhesive or binder in the first layer 110 and/or the third layer 130, and/or for plastic fragments in those layers. For example, the plastic fragments in the first layer 110 and/or the second layer may include fragments of TPO and/or flexible PVC. In some embodiments, the first layer 110 and/or the third layer 130 may include a thermoplastic binder including thermoplastic polyolefin (TPO). The plastic fragments of the first layer 110 and/or the third layer 130 may also include TPO fragments. In some embodiments, as discussed above, the second layer 120 may include a thermosetting resin. In some embodiments, instead of or in addition to the thermosetting resin, the second layer 120 may include a thermoplastic binder such as TPO, flexible PVC, and/or one or more of the other thermoplastic materials discussed above. In some embodiments, the plastic fragments in the second layer may include fragments of TPO and/or flexible PVC. In some embodiments, fragments in a first blend of fragments forming the first layer 110 and/or the third layer 130 may be coated in TPO and/or flexible PVC.

In some embodiments, the paper and plastic fragments of the second layer 120 or of the second blend may be coated with an adhesive while the paper and plastic fragments of the first layer 110 and the third layer 130 or of the second blend are not coated with an adhesive. In other embodiments, the paper and plastic fragments of the first layer 110 and the third layer 130 or of the second blend may be coated with an adhesive while the paper and plastic fragments of the second layer 120 or of the second blend are not coated with an adhesive. In yet other embodiments the paper and plastic fragments of the second layer 120 or of the second blend as well as the paper and plastic fragments of the first layer 110 and the third layer 130 or of the second blend may be coated with an adhesive.

The first layer 110, second layer 120, and third layer 130 may include additional materials. The layers may include preservatives, colorants, water repellents, fire retardants, odor blockers, adhesion promoters, fibers, and other functional additives. In some embodiments additives in a layer will be less than about 5% of the layer by weight. The second layer 120 may include filler material. The filler material may be almost any material coated with the adhesive. For example, the second material may include gravel coated with the adhesive.

In some embodiments, it will be advantageous to treat the fragments in the first layer 110, second layer 120, and third layer 130 with a tackifying resin. In other embodiments, a tackifying resin can be applied to only the first layer 110 and the third layer 130. Optionally, the tackifying resin can be applied to only one fragment layer or any combination of fragment layers. Tackifying resins can include amino resins, certain epoxy resins, certain polyurethane resins, certain resins based on terpenes, or other substances that impart a level of stickiness to the fragments.

Figure 2:
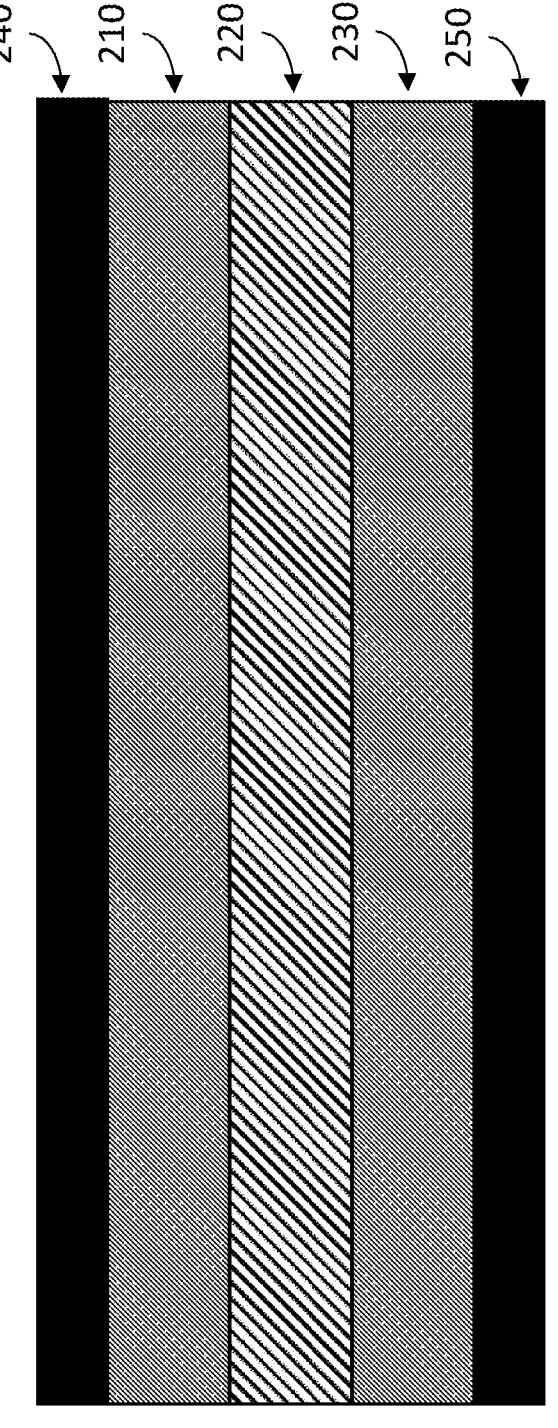
FIG. 2 is a side cutout view of another example panel according to another embodiment.

FIG. 2 is a side cutout view of another example panel 200. The panel 200 may include a first layer 210, a second layer 220, a third layer 230, a first exterior layer 240, and a second exterior layer 250. The first layer 210, the second layer 220, and the third layer 230 may be the same as or similar to the first layer 110, the second layer 120, and the third layer 130, respectively, of FIG. 1. For example, the first layer 210 and the third layer 230 may include paper and plastic fragments of the first blend while the second layer 220 may include paper and plastic fragments of the second blend. Additionally, in some embodiments the paper and plastic fragments of the second layer 220 or of the second blend may be coated with an adhesive while in other embodiments, the paper and plastic fragments of the first layer 210 and/or third layer 230 or of the first blend may be coated with an adhesive. In some embodiments, the first layer 210 may be omitted. In other embodiments, the third layer 230 may be omitted. In yet other embodiments, the first layer 210 and third layer 230 may be omitted. In further embodiments, the first exterior layer 240 may be omitted. In other further embodiments, the second exterior layer 250 may be omitted. The second layer 220 is disposed between first layer 210 and the third layer 230. The first exterior layer 240 and the second exterior layer 250 are disposed on opposite exterior faces of the panel 200. The first layer 210 and the third layer 230 may have the same thickness. The first exterior layer 240 and the second exterior layer 250 may have the same thickness. The first layer 210 and the third layer 230 may each have a thickness greater than the thickness of the first exterior layer 240 and/or the second exterior layer 250. The second layer 220 may have a thickness greater than that of the first layer 210 and/or the third layer 230. In some embodiments the panel may have a length of about 8 feet, a width of about 4 feet, and a thickness of about 0.125-1.5 inches. In other embodiments, the composite might be cut into the shape of boards, such as boards having a dimension of 16 feet long, a width of 8 inches, and a thickness of about 0.5 inches. In other embodiments, the composite could have a length of about 0.1-60 feet, a width of about 0.1-24 feet, and a thickness of about 0.1-2.0 inches.

In some embodiments, the paper and plastic fragments of the second layer 220 or of the second blend may be coated with an adhesive. The adhesive may be about 1-20% of the second layer 220 by weight. In some embodiments, the adhesive may be about 2-8% of the second layer 220 by weight. The adhesive may be a thermoplastic adhesive or a thermosetting adhesive. Thermosetting adhesives include isocyanates, polyurethanes, polyurea resins, phenolic resins, amino resins (including urea-formaldehyde resins, melamine-formaldehyde resins, or melamine-urea-formaldehyde resins), epoxy resins (including two-part liquid epoxy resins or one-part powdered epoxy resins), crosslinked polysaccharides, and resins based on soy and poly(amide epichlorohydrin) (PAE). Thermoplastic adhesives include latex emulsions, powdered polyethylene, powdered polypropylene, powdered copolymers of ethylene and propylene, powdered polystyrene, and other polymeric powders with a melt-point that is less than about 350° F. The adhesive used for coating the paper and plastic fragments of the second layer 220 may be selected based on an intended application of the panel or required physical attributes of the panel. For example, for a panel application requiring a stiff panel, a thermosetting adhesive with a high level of crosslinking will be useful to maximize the modulus of elasticity of the composite. In another example, a panel application requiring a high impact resistance, a thermosetting adhesive with a low level of crosslinking will be useful to improve the toughness of the panel and its ability to absorb and dissipate kinetic energy from an impact.

In some embodiments the paper and plastic fragments of the first layer 210 and/or the third layer 230 of the first blend may be coated with an adhesive. The adhesive may be about 1-20% of the first layer 210 or third layer 230 by weight. In some embodiments, the adhesive may be about 2-8% of the first layer 210 or third layer 230 by weight. The adhesive may be a thermoplastic adhesive or a thermosetting adhesive. Thermosetting adhesives include isocyanates, polyurethanes, polyurea resins, phenolic resins, amino resins (including urea-formaldehyde resins, melamine-formaldehyde resins, or melamine-urea-formaldehyde resins), epoxy resins (including two-part liquid epoxy resins or one-part powdered epoxy resins), crosslinked polysaccharides, or resins based on soy and poly(amide epichlorohydrin) (PAE). Thermoplastic adhesives include latex emulsions, powdered polyethylene, powdered polypropylene, powdered copolymers of ethylene and propylene, powdered polystyrene, and other polymeric powders with a melt-point that is less than about 350° F. The adhesive used for coating the paper and plastic fragments of the first layer 210 or the third layer 230 may be selected based on an intended application of the panel or required physical attributes of the panel. For example, for a panel application requiring a stiff panel, a thermosetting adhesive with a high level of crosslinking will be useful to maximize the modulus of elasticity of the composite. In another example, a panel application requiring a high impact resistance, a thermosetting adhesive with a low level of crosslinking will be useful to improve the toughness of the panel and its ability to absorb and dissipate kinetic energy from an impact.

In some embodiments, the paper and plastic fragments of the second layer 220 or of the second blend may be coated with an adhesive while the paper and plastic fragments of the first layer 210 and the third layer 230 or of the second blend are not coated with an adhesive. In other embodiments, the paper and plastic fragments of the first layer 210 and the third layer 230 or of the second blend may be coated with an adhesive while the paper and plastic fragments of the second layer 220 or of the second blend are not coated with an adhesive. In yet other embodiments the paper and plastic fragments of the second layer 220 or of the second blend as well as the paper and plastic fragments of the first layer 210 and the third layer 230 or of the second blend may be coated with an adhesive.

The first exterior layer 240 and the second exterior 250 may include an intractable material. An intractable material is a polymeric material which is insoluble in water and which has a melting point greater than about 350 degrees Fahrenheit. For example, an intractable material may be paper, woven cellulosic fabrics, hydroentangled cellulosic nonwoven fabrics, nylon film, polyester film, nylon nonwoven fabrics, polyester glass woven roving, metallic foils, and other thin sheet or roll goods having a melting point above 350 degrees Fahrenheit. In some embodiments, the first exterior layer 240 and the second exterior layer 250 include an intractable material having a melting point greater than 450 degrees Fahrenheit or an intractable material having no recognized melting point. Additionally, intractable materials can include multi-layered laminates, such as laminates comprised of a layer of nylon and a layer of polyethylene, laminates comprised of a layer of polyester and a layer of polyethylene, or laminates comprised of a layer of polyester, a layer of paper, and a layer of polyethylene. In these examples, the polyethylene layer is not intractable, but functions as a thermoplastic binder.

The first exterior layer 240 may be attached to the first layer 210 and the second exterior layer 250 may be attached to the third layer 230 in order to sandwich panel 200. The first exterior layer 240 may be attached to the first layer 210 by a thermoplastic adhesive, a thermosetting adhesive, or a mechanical fastening system. In some embodiments, the thermosetting adhesive used to attach the first exterior layer 240 to the first layer 210 may be a thermosetting adhesive used to coat the fragments of the second layer 220.

The first exterior layer 240 and the second exterior layer may cover a portion of an area of the panel 200 or the entirety of the area of the panel 200. The first exterior layer 240 and second exterior layer 250 may cover identical or mirror areas of the panel on opposite exterior surfaces of the panel. The first exterior layer 240 and the second exterior layer 250 may each have a thickness greater than about 0.00001 inches and less than about 0.20 inches. The first exterior layer 240 and the second exterior layer 250 may together be about 1-20% of the panel by weight.

Figure 3:
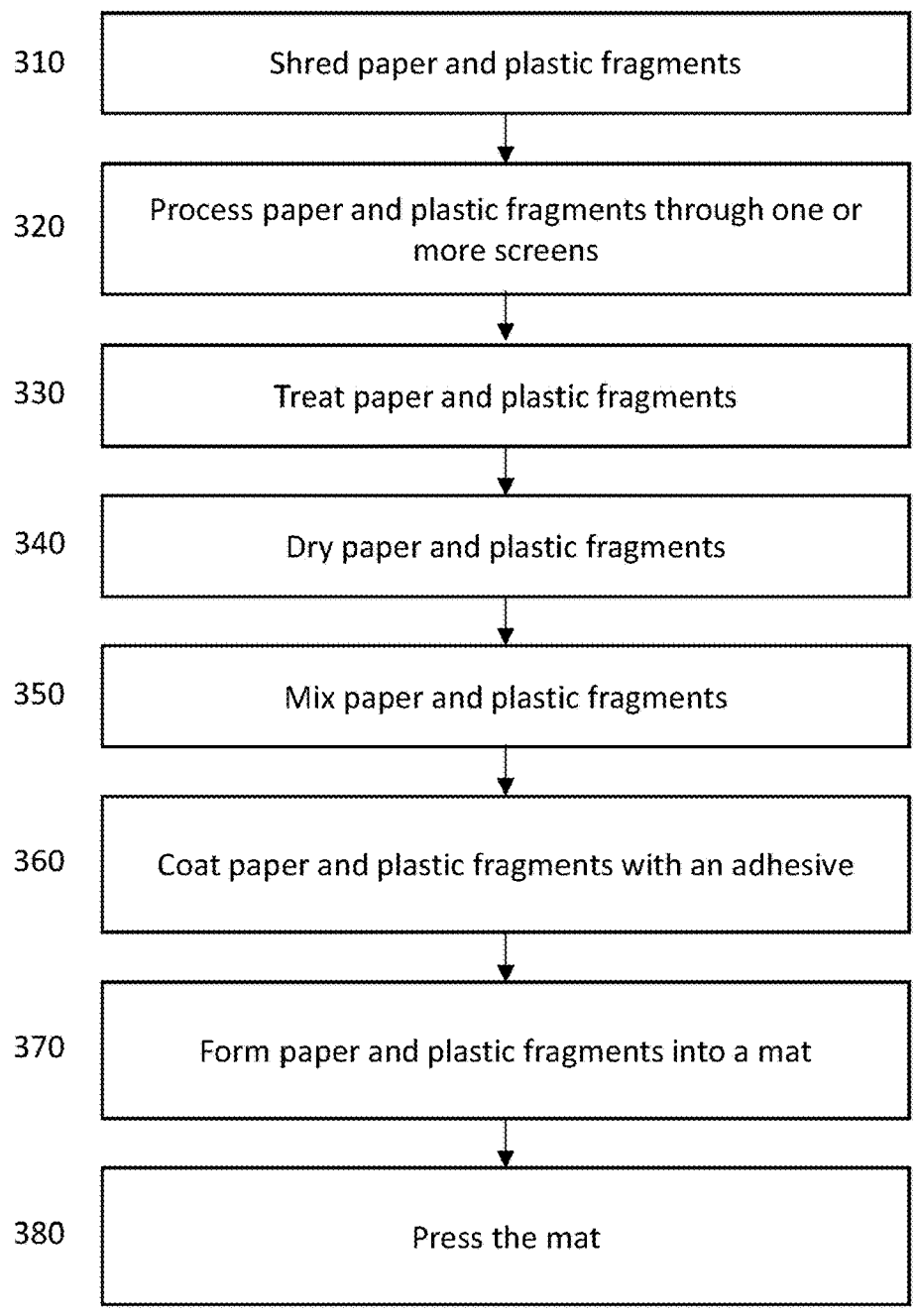
FIG. 3 is a flow diagram depicting operations in a panel manufacturing process, in accordance with an example embodiment.

FIG. 3 is a flow diagram depicting operations in a panel manufacturing process 300, in accordance with an example embodiment. Additional, fewer, or different operations may be performed in the method, depending on the embodiment. Further, the operations may be performed in the order shown, concurrently, or in a different order. At 310 paper and plastic fragments are shredded. The paper and plastic fragments may be shredded from existing fragments, or by shredding larger objects or materials. The paper and plastic fragments may be shredded from new material or from recycled objects or material. In some embodiments, the paper and plastic fragments are obtained without shredding. Paper and plastic shredding can be done by a common machine or using a different shredder for paper than a shredder for plastic.

At 320 the paper and plastic fragments are processed through one or more screens. Processing the fragments through screens may be done to achieve a certain size of fragments or to screen out other material. For example, paper fragments can be obtained by milling pieces of paper until the fragments pass through a 1-inch mesh screen. Screens with larger or smaller mesh sizes may be used. In another example, paper fragments are obtained by shredding recycled paper until the paper fragments pass through a 19-mm mesh screen and plastic fragments are obtained by shredding recycled plastic film until the plastic fragments pass through a 19-mm mesh screen. If multiple screens are used, the screens may or may not have the same size apertures in the mesh.

At 330 the paper and plastic fragments may be treated. In some embodiments, the fragments may be treated using one or more multifunctional aldehydes or a treatment composition derived from urea and one or more multifunctional aldehydes. Treating the fragments with one or more multifunctional aldehydes or a treatment composition derived from urea and one or more multifunctional aldehydes may crosslink endotoxins of the fragments. For example, the fragments may be treated by loading the fragments into a rotary blender and spraying the fragments with a urea-glutaraldehyde solution while rotating at 10 rpm. In some embodiments, the molar ratio of urea to glutaraldehyde in the solution may be greater than 1. In other embodiments, the fragments may be treated using one or more antimicrobial agents.

At 340 the paper and plastic fragments are dried. The paper fragments and plastic fragments may be dried separately or together. The paper fragments and/or the plastic fragments may be dried in a rotary drier. For example, the fragments may be dried in a rotary drier with an inlet temperature of about 250° F. and an outlet temperature of about 180° F. for a period of about 1-15 minutes. Alternatively, drying could occur in a ventilated oven at a temperature of 180° F. for a period of 2-3 hours. The drying temperature and time may vary based on an original moisture content of paper and plastic fragments, an intended application, and whether and how the fragments were treated. The fragments may be dried to reduce their moisture content. The fragments may be dried to have a moisture content less than about 10%. In some embodiments, the fragments may be dried to have a moisture content less than about 5%.

At 350 the paper and plastic fragments are mixed. The paper fragments and plastic fragments may be mixed to achieve a desired paper/plastic ratio. In some embodiments, an amount of paper fragments and an amount of plastic fragments may be added to a mixing vessel. A mixing vessel may be, for example, a rotating drum blender equipped with internal flights. The amount of paper fragments and the amount of plastic fragments added to the mixing vessel may be controlled by weigh belts and flow gates. For example, a weigh belt may send a signal to a flow gate attached to a storage bin to either open or close based on the weight belt sensing that a current flow rate is under or over, respectively, a flow rate target. Other mixing devices and/or mixing procedures may be used to achieve the desired paper/plastic ratio.

At 360 the paper fragments and plastic fragments are coated with an adhesive. The adhesive may be applied to the fragments before, during, or after the fragments are mixed. For example, the adhesive may be applied to paper fragments in a first blender while the adhesive is applied to plastic fragments in a second blender, and then the paper and plastic fragments are mixed. In this example, different mixing devices or systems can be used for the paper fragments and the plastic fragments. In another example, the adhesive is applied to a mixture of paper fragments and plastic fragments in one blender.

In some embodiments, the fragments may be coated with a liquid adhesive. The liquid adhesive may be a liquid adhesive which is sprayed at a rate configured to achieve a targeted adhesive level. The liquid adhesive may be a one-component liquid or a two-component, liquid/liquid adhesive of which the two components are proportionally pumped to a mixing device before the resulting mixture is sprayed onto the fragments. In some embodiments the liquid adhesive may be dispensed into a blender through one or more airless or air-assisted spray application devices. In other embodiments, the liquid adhesive may be applied by use of a spinning disk atomizer.

In some embodiments, the fragments may be coated with a powder adhesive. The powder adhesive may be added to the fragments in an amount configured to achieve a targeted adhesive level. The powder adhesive may be dosed into a blender using an auger, screw, conveyor, blow pipe, or other means. The powder adhesive may be dosed into the blender with a mass flow rate configured to achieve the targeted adhesive level. For example, the powder adhesive may be added to the blender at the same time as the fragments and the flow rate of the powder adhesive will be based on the flow rate of the fragments so as to achieve the targeted adhesive level.

In some embodiments, the adhesive may coat the paper fragments and the plastic fragments equally. In other embodiments, the adhesive may coat the paper fragments more than the plastic fragments. In yet other embodiments, the adhesive may coat the plastic fragments more than the paper fragments. The adhesive may coat each fragment completely so that 100% of the fragment surface area is coated with adhesive. The adhesive may coat each fragment so that 95%, 90%, 85%, 80%, 75%, 70%, 65%, 60%, 55%, 50%, 45%, 40%, 35%, 30%, 25%, 20%, 15%, 10%, or 5% of the fragment surface area is coated with adhesive.

At 370 the paper fragments and the plastic fragments are formed into a mat. In some embodiments the mat may be formed by dispensing fragments onto a conveyor belt in distinct layers. Alternatively, a first exterior layer 240 can be transported on a conveyor belt and fragments can be dispensed onto the exterior layer 240 in one or more layers. In yet another embodiment, a second exterior layer 250 can be placed on top of previously dispensed layers of fragments. Further yet, fragments and optionally exterior layers can be formed into a mat by use of a forming box. The forming box may refer to a frame with a floor. In some embodiments the forming box may have a shape corresponding to a shape of a panel. The forming box may have dimensions larger than or equal to dimensions of the pressed composite or panel. The fragments may be distributed uniformly in the forming box. The fragments may be compressed within the forming box at a temperature of about 50-150° F. For example, the fragments may be compressed by a hydraulic press as the fragments are in the forming box. In other embodiments, the paper fragments and the plastic fragments are formed into a mat in a continuous sheet or ribbon. For example, the fragments may be uniformly distributed on a conveyor belt and compressed by a press or roller to form a mat that is thinner than the mat that was initially formed. Use of the aforementioned tackifying resin can help to ensure that the compressed mat retains its thinner dimension and fragments are generally not expelled from the left or right edges of the mat. Once formed, the mat may be separated from the forming box or advanced in a continuous manner such that the mat is transferred from the forming line to the pressing station.

At 380 the mat formed from the paper fragments and the plastic fragments is pressed. Pressing the mat may include pressing the mat first with a hot press and second with a cold press. The hot press may have a first temperature and the cold press may have a second temperature lower than the first temperature. The hot press may include a hot press bottom platen and a hot press top platen. The hot press may press the mat between the hot press bottom platen and the hot press top platen. The cold press may include a cold press bottom platen and a cold press top platen. The cold press may press the mat between the cold press bottom platen and the cold press top platen. The hot press may apply a first amount of pressure to the mat and the cold press may apply a second amount of pressure to the mat. In some embodiments the hot press may rapidly increase pressure on the mat to achieve a maximum hot press pressure. This maximum hot press pressure might be maintained during the remaining portion of the hot press process or the pressure might be reduced. In some embodiments, the pressure applied to the mat during hot pressing will be essentially uniform or constant with respect to time. In other embodiments, greater amounts of pressure might be applied to the mat during initial stages, while lesser amounts of pressure are applied to the mat during later stages. In some embodiments, the cold press may rapidly increase pressure on the mat to achieve a maximum cold press pressure. This maximum cold press pressure might be maintained during the remaining portion of the cold press process or the pressure might be reduced. The hot press may apply the first amount of pressure a first amount of time. The cold press may apply the second amount of pressure a second amount of time. For example, a hot press having a temperature of 400° F. may press a mat rapidly, such that a pressure of about 400-800 psi is achieved over the first 10 seconds. The hot press may thereafter reduce the pressure applied to the mat such that the pressure is reduced to less than 50 psi after a period of about 30-60 seconds. A pressure of less than 50 psi might be maintained on the mat for an additional period of about 270-300 seconds for the remaining portion of the hot pressing event. Longer hot press times may be required for mats thicker than about 0.40 inches, while shorter hot press times might be suitable for mats thinner than about 0.40 inches. Use of certain adhesives, especially thermosetting adhesives, can facilitate the use of shorter hot press times. Within a period of about 0-120 seconds after the mat has undergone the hot press process, the mat can be transferred from the hot press to the cold press. The cold press can have a platen temperature of about 20-150° F. A pressure of about 5-50 psi can be exerted on the mat during cold pressing. The duration of cold pressing can be about 330 seconds. Longer cold press times may be required for mats thicker than about 0.40 inches, while shorter cold press times might be suitable for mats thinner than about 0.40 inches.

In some embodiments the mat formed from the paper fragments and the plastic fragments is a continuous sheet or ribbon and is pressed into a continuous sheet or ribbon from which panels are cut. For example, a conveyor belt may carry the continuous mat to the hot and cold presses. The conveyor may have dimensions equal to or greater than a dimension of the panel. The conveyor may move the continuous mat so that a first portion of the mat can be pressed by the hot press, cease movement while the hot press presses the first portion, move the continuous mat so that the first portion can be pressed by the cold press and a second portion can be pressed by the cold press, cease movement while the cold press presses the first portion and the hot press presses the second portion, and move the continuous mat so that the second portion can be pressed by the hot press. In this way, a continuous sheet or ribbon of mat can be pressed into panel material from which individual panels may be cut. The hot press and the cold press may be larger than the dimensions of the panel. The hot press and the cold press may be large enough to press a section of the continuous mat equal to the area of many panels. There may be multiple hot presses and multiple cold presses. In another example, a conveyor belt may carry the continuous mat to a continuous hot press, which comprises top and bottom thin metal belts, which sandwich the mat. A series of rollers are used to mechanically support and guide the top and bottom belts within the continuous hot press. The hot press is heated by use of heated platens which are positioned directly behind the rollers. A continuous cold press, with cold rollers, can be positioned in-line, subsequent to the continuous hot press. The continuous hot press and the continuous cold press may perform the same function as the batch hot press and the batch cold press of heating and compressing, and then cooling, the mat.

Advantageously, the manufacturing process 300 assembles the mat and consolidates it into a panel in a relatively cold state as compared to conventional methods. The cooler state requires lower energy expenditure and preserves the spatial order of the panel components throughout the process. The manufacturing process allows for the preparation of panels with functional layers that yield specific mechanical or other desirable properties. Additionally, the inclusion of large amounts of paper compared to conventional processes which utilize almost exclusively plastic, allows for the fine-tuning of mechanical or other desirable properties. The fragments in each layer generally maintain their relative position, preserving the layer structure as well as the arrangement of fragments within each layer, which allows for the production of panels with improved physical properties. Maintaining the relative position of the fragments allows for blends of paper and plastic to be preserved as mixtures of paper and plastic throughout the production process and in the finished panel. Maintaining the relative position of the fragments also allows for layers of paper and plastic to be preserved within each layer. Additionally, producing panels in a continuous sheet or ribbon has the advantage of greater efficiency and greater uniformity than conventional methods which produce one panel at a time.

FIG. 4 is a flow diagram depicting operations in a panel manufacturing process 400, in accordance with another example embodiment. Additional, fewer, or different operations may be performed in the method, depending on the embodiment. Further, the operations may be performed in the order shown, concurrently, or in a different order. At 405 paper fragments of a first size are obtained. In some embodiments, the paper fragments may be obtained by shredding existing fragments, or by shredding larger objects or materials. The paper fragments may be shredded from new material, recycled objects or material, or even objects or materials that are recovered from waste streams. The shredded paper fragments may be processed through one or more screens to obtain paper fragments of the first size. For example, paper fragments can be obtained by milling pieces of paper until the fragments pass through a 1-inch mesh screen. Screens with larger or smaller mesh sizes may be used. In another example, paper fragments are obtained by shredding recycled paper until the paper fragments pass through a 19-mm mesh. If multiple screens are used, the screens may or may not have the same size apertures in the mesh. In other embodiments the paper fragments of the first size are obtained without shredding. The paper fragments of the first size may be purchased or obtained in some other manner.

At 410 plastic fragments of a second size are obtained. The second size may be the same or different from the first size. In some embodiments, the plastic fragments may be obtained by shredding existing fragments, or by shredding larger objects or materials. The plastic fragments may be shredded from new material, recycled objects or material, or even objects or materials that are recovered from waste streams. The plastic fragments may be obtained using the same shredder used to obtain the paper fragments of the first size or by using a different shredder. The shredded plastic fragments may be processed through one or more screens to obtain plastic fragments of the second size. For example, plastic fragments can be obtained by milling pieces of plastic until the fragments pass through a 1-inch mesh screen. Screens with larger or smaller mesh sizes may be used. In another example, plastic fragments are obtained by shredding recycled plastic until the plastic fragments pass through a 19-mm mesh. If multiple screens are used, the screens may or may not have the same size apertures in the mesh. In other embodiments the plastic fragments of the first size are obtained without shredding. The plastic fragments of the second size may be purchased or obtained in some other manner.

At 415 paper fragments of a third size are obtained. The third size may be the same or different from the first size and/or the second size. In some embodiments the paper fragments may be obtained by shredding existing fragments, or by shredding larger objects or materials. The paper fragments may be shredded from new material or from recycled objects or material. The paper fragments may be obtained using the same shredder used to obtain the paper fragments of the first size and/or the plastic fragments of the second size or by using a different shredder. The shredded paper fragments may be processed through one or more screens to obtain paper fragments of the third size. For example, paper fragments can be obtained by milling pieces of paper until the fragments pass through a 1-inch mesh screen. Screens with larger or smaller mesh sizes may be used. In another example, paper fragments are obtained by shredding recycled paper until the paper fragments pass through a 19-mm mesh. If multiple screens are used, the screens may or may not have the same size apertures in the mesh. In other embodiments the paper fragments of the first size are obtained without shredding. The paper fragments of the third size may be purchased or obtained in some other manner.

At 420 plastic fragments of a fourth size are obtained. The fourth size may be the same or different from the first size, the second size, and/or the third size. In some embodiments the plastic fragments may be obtained by shredding existing fragments, or by shredding larger objects or materials. The plastic fragments may be shredded from new material or from recycled objects or material. The plastic fragments may be obtained using the same shredder used to obtain the paper fragments of the first size, the plastic fragments of the second size, and/or the paper fragments of the third size, or by using a different shredder. The shredded plastic fragments may be processed through one or more screens to obtain plastic fragments of the fourth size. For example, plastic fragments can be obtained by milling pieces of plastic until the fragments pass through a 1-inch mesh screen. Screens with larger or smaller mesh sizes may be used. In another example, plastic fragments are obtained by shredding recycled plastic until the plastic fragments pass through a 19-mm mesh. If multiple screens are used, the screens may or may not have the same size apertures in the mesh. In other embodiments the plastic fragments of the first size are obtained without shredding. The plastic fragments of the fourth size may be purchased or obtained in some other manner.

At 425 the paper fragments of the first size, the plastic fragments of the second size, the paper fragments of the third size, and the plastic fragments of the fourth size may be treated. In some embodiments, the fragments may be treated using one or more multifunctional aldehydes or a treatment composition derived from urea and one or more multifunctional aldehydes. Treating the fragments with one or more multifunctional aldehydes or a treatment composition derived from urea and one or more multifunctional aldehydes may crosslink endotoxins of the fragments. For example, the fragments may be treated by loading the fragments into a rotary blender and spraying the fragments with a urea-glutaraldehyde solution while rotating at 10 rpm. In some embodiments the molar ratio of urea to glutaraldehyde in the solution may be greater than 1. In other embodiments, the fragments may be treated using one or more antimicrobial agents.

At 430 the paper fragments of the first size, the plastic fragments of the second size, the paper fragments of the third size, and the plastic fragments of the fourth size may be dried. The paper fragments of the first size, the plastic fragments of the second size, the paper fragments of the third size, and the plastic fragments of the fourth size may be dried separately or together. The fragments may be dried in a rotary drier. For example, the fragments may be dried in a rotary drier with an inlet temperature of about 250° F. and an outlet temperature of about 180° F. for a period of about 1-15 minutes. Alternatively, drying could occur in a ventilated oven at a temperature of 180° F. for a period of 2-3 hours. The drying temperature and time may vary based on an original moisture content of the fragments, an intended application, and whether and how the fragments were treated. The fragments may be dried to reduce their moisture content. The fragments may be dried to have a moisture content less than about 10%. In some embodiments the fragments may be dried to have a moisture content less than about 5%.

At 435 the paper fragments of the first size and the plastic fragments of the second size are mixed into a first blend. The paper fragments of the first size and the plastic fragments of the second size may be mixed to achieve a desired paper/plastic ratio. In some embodiments an amount of paper fragments of the first size and an amount of plastic fragments of the second size may be added to a mixing vessel. A mixing vessel may be, for example, a rotating drum blender equipped with internal flights. The amount of paper fragments of the first size and the amount of plastic fragments of the second size added to the mixing vessel may be controlled by weigh belts and flow gates. For example, a weigh belt may send a signal to a flow gate attached to a storage bin to either open or close based on the weight belt sensing that a current flow rate is under or over, respectively, a flow rate target. Other mixing devices and/or mixing procedures may be used to achieve the desired paper/plastic ratio.

At 440 the paper fragments of the third size and the plastic fragments of the fourth size are mixed into a second blend. The paper fragments of the third size and the plastic fragments of the fourth size may be mixed to achieve a desired paper/plastic ratio. In some embodiments an amount of paper fragments of the third size and an amount of plastic fragments of the fourth size may be added to a mixing vessel. A mixing vessel may be, for example, a rotating drum blender equipped with internal flights. The amount of paper fragments of the third size and the amount of plastic fragments of the fourth size added to the mixing vessel may be controlled by weigh belts and flow gates. For example, a weigh belt may send a signal to a flow gate attached to a storage bin to either open or close based on the weight belt sensing that a current flow rate is under or over, respectively, a flow rate target. Other mixing devices and/or mixing procedures may be used to achieve the desired paper/plastic ratio.

At 445 the paper fragments of the third size and the plastic fragments of the fourth size of the second blend are coated with an adhesive. The adhesive may be applied to the fragments before, during, or after the fragments are mixed. For example, the adhesive may be applied to the paper fragments of the third size in a first blender while the adhesive is applied to plastic fragments of the fourth size in a second blender, and then the paper and plastic fragments are mixed. In this example, different mixing devices or systems can be used for the paper fragments and the plastic fragments. In another example, the adhesive is applied to mixed paper fragments of the third size and plastic fragments of the fourth size in one blender.

In some embodiments, the fragments may be coated with a liquid adhesive. The liquid adhesive may be a liquid adhesive which is sprayed at a rate configured to achieve a targeted adhesive level. The liquid adhesive may be a one-component or a two-component, liquid/liquid adhesive of which the two components are proportionally pumped to a mixing device before the resulting mixture is sprayed onto the fragments. In some embodiments the liquid adhesive may be dispensed into a blender through one or more airless or air-assisted spray application devices. In other embodiments, the liquid adhesive may be applied by use of a spinning disk atomizer.

In some embodiments, the fragments may be coated with a powder adhesive. The powder adhesive may be added to the fragments in an amount configured to achieve a targeted adhesive level. The powder adhesive may be dosed into a blender using an auger, screw, conveyor, blow pipe, or other means. The powder adhesive may be dosed into the blender with a mass flow rate configured to achieve the targeted adhesive level. For example, the powder adhesive may be added to the blender at the same time as the fragments and the flow rate of the powder adhesive will be based on the flow rate of the fragments so as to achieve the targeted adhesive level.

In some embodiments, the adhesive may coat the paper fragments of the third size and the plastic fragments of the fourth size equally. In other embodiments, the adhesive may coat the paper fragments more than the plastic fragments. In yet other embodiments, the adhesive may coat the plastic fragments more than the paper fragments. The adhesive may coat each fragment completely so that 100% of the fragment surface area is coated with adhesive. The adhesive may coat each fragment so that 95%, 90%, 85%, 80%, 75%, 70%, 65%, 60%, 55%, 50%, 45%, 40%, 35%, 30%, 25%, 20%, 15%, 10%, or 5% of the fragment surface area is coated with adhesive.

At 450 a first layer is formed using the first blend. In some embodiments the first layer may be formed by placing the fragments of the first blend into a forming box. The forming box may refer to a closed box or a continuous line, also termed a forming line, in which layers or a mat formed from layers are formed. In some embodiments, the forming box may have a shape corresponding to a shape of a panel. The forming box may have dimensions larger than or equal to dimensions of the panel. The fragments of the first blend may be distributed uniformly in the forming box. The fragments of the first blend may be compressed within the forming box. For example, the fragments of the first blend may be compressed by a hydraulic press. In other embodiments, the paper fragments of the first blend and the plastic fragments of the first blend are formed into a first layer in a continuous sheet or ribbon. For example, the fragments of the first blend may be uniformly distributed on a conveyor belt and compressed by a press or roller. In another example, the first layer may be formed by dispensing fragments of the first blend onto a conveyor belt without pressing or rolling.

At 455 a second layer is formed using the second blend. In some embodiments the second layer may be formed by placing the fragments of the second blend into a forming box on top of the first layer. In some embodiments, the forming box may have a shape corresponding to a shape of a panel. The forming box may have dimensions larger than or equal to dimensions of the panel. The fragments of the second blend may be distributed uniformly in the forming box. The fragments of the second blend may be compressed within the forming box. For example, the fragments of the second blend may be compressed by a hydraulic press. In other embodiments, the paper fragments of the second blend and the plastic fragments of the second blend are formed into a second layer in a continuous sheet or ribbon. For example, the fragments of the second blend may be uniformly distributed on a conveyor belt on top of the first layer and compressed by a batch press, a continuous press, or one or more rollers. In another example, the second layer may be formed by dispensing fragments of the second blend onto a conveyor belt without pressing or rolling.

At 460 a third layer is formed using the first blend. In some embodiments the third layer is formed using a third blend. In some embodiments, the third layer may be formed by placing the fragments of the first blend into a forming box on top of the first layer and the second layer. In some embodiments the forming box may have a shape corresponding to a shape of a panel. The forming box may have dimensions larger than or equal to dimensions of the panel. The fragments of the first blend may be distributed uniformly in the forming box. The fragments of the first blend may be compressed within the forming box. For example, the fragments of the first blend may be compressed by a hydraulic press. In other embodiments, the paper fragments of the first blend and the plastic fragments of the first blend are formed into a third layer in a continuous sheet or ribbon. For example, the fragments of the first blend may be uniformly distributed on a conveyor belt on top of the first layer and the second layer and compressed by a batch press, a continuous press, or one or more rollers. In another example, the first layer may be formed by dispensing fragments of the first blend onto a conveyor belt without pressing or rolling. The first layer, the second layer, and the third layer may form a mat. In some embodiments the mat formed from the first layer, the second layer, and the third layer may be a continuous sheet or ribbon. The mat may be separated from the forming box.

At 465 the first layer, the second layer, and the third layer are consolidated into a panel using heat and pressure. Consolidating the first layer, the second layer, and the third layer into a panel using heat and pressure may include pressing the mat formed of the first layer, the second layer, and the third layer first with a hot press and second with a cold press. The hot press may have a first temperature and the cold press may have a second temperature lower than the first temperature. The hot press may include a hot press bottom platen and a hot press top platen. The hot press may press the mat between the hot press bottom platen and the hot press top platen. The cold press may include a cold press bottom platen and a cold press top platen. The cold press may press the mat between the cold press bottom platen and the cold press top platen. The hot press may apply a first amount of pressure to the mat and the cold press may apply a second amount of pressure to the mat. The hot press may rapidly increase pressure on the mat to achieve a maximum hot press pressure. This maximum hot press pressure might be maintained during the remaining portion of the hot press-process or the pressure might be reduced. In some embodiments, the pressure applied to the mat during hot pressing will be essentially uniform. In other embodiments, greater amounts of pressure might be applied to the mat at early stages of hot-pressing, while lesser amounts of pressure are applied to the mat during latter stages of hot pressing. The cold press may rapidly increase pressure on the mat to achieve a maximum cold press pressure. This maximum cold press pressure might be maintained during the remaining portion of the cold press-process or the pressure might be reduced. The hot press may apply the first amount of pressure a first amount of time. The cold press may apply the second amount of pressure a second amount of time. For example, a hot press having a temperature of 400° F. may press the mat in a manner that achieves a pressure of about 400-800 psi during the first 10 seconds of hot pressing. The hot press may thereafter reduce the pressure applied to the mat such that the pressure is reduced to less than 50 psi after a period of about 30-60 seconds. A pressure of less than 50 psi might be maintained on the mat for an additional period of about 270-300 seconds during the final stages of the hot-pressing event. Longer hot press times may be required for mats thicker than about 0.40 inches, while shorter hot press times might be suitable for mats thinner than about 0.40 inches. Use of adhesive, especially a thermosetting adhesive, can facilitate the use of shorter hot press times. Within a period of about 0-120 seconds after the mat has undergone the hot press process, the mat can be transferred from the hot press to the cold press. The cold press can have a platen temperature of about 20-150° F. A pressure of about 5-50 psi can be exerted on the mat during cold pressing. The duration of cold pressing can be about 330 seconds. Longer cold press times may be required for mats thicker than about 0.40 inches, while shorter cold press times might be suitable for mats thinner than about 0.40 inches.

In some embodiments, the mat formed from the first layer, the second layer, and the third layer is a continuous sheet or ribbon with a first density, and is consolidated into a continuous sheet or ribbon with a second density, which is greater than the first density, and from which panels are cut. For example, a conveyor belt may carry the continuous mat to the hot and cold presses. The conveyor may have dimensions equal to or greater than a dimension of the panel. The conveyor may move the continuous mat so that a first portion of the mat can be pressed by the hot press, cease movement while the hot press presses the first portion, move the continuous mat so that the first portion can be pressed by the cold press and a second portion can be pressed by the hot press, cease movement while the cold press presses the first portion and the hot press presses the second portion, and move the continuous mat so that the second portion can be pressed by the cold press. In this way, a continuous sheet or ribbon of mat formed from the first layer, the second layer, and the third layer can be consolidated into panel material from which individual panels may be cut. The hot press and the cold press may be larger than the dimensions of the panel. The hot press and the cold press may be large enough to press a section of the continuous mat equal to the area of many panels. There may be multiple hot presses and multiple cold presses. In another example, a conveyor belt may carry the continuous mat to hot rollers and cold rollers. The hot rollers and the cold rollers may perform the same function as the hot press and the cold press of heating and compressing the mat. The conveyor belt may not need to cease movement when the continuous mat is pressed by the hot rollers and the cold rollers. In yet another embodiment, a conveyor belt may carry the continuous mat to a continuous hot press, which comprises top and bottom thin metal belts, which sandwich the mat. A series of rollers are used to mechanically support and guide the top and bottom belts within the continuous hot press. The hot press is heated by use of heated platens which are positioned directly behind the rollers. A continuous cold press, with cold rollers, can be positioned in-line, subsequent to the continuous hot press. The continuous hot press and the continuous cold press may perform the same function as the batch hot press and the batch cold press of heating and compressing, and then cooling, the mat.

At 470 intractable surface layers are attached to the top and bottom surfaces of the panel. The top and bottom surfaces of the panel may be the first layer and the third layer. An intractable material is a polymeric material which is insoluble in water, and which has a melting point greater than about 350° F. For example, an intractable material may be paper, wood veneer, woven cellulosic fabrics, hydroentangled cellulosic nonwoven fabrics, nylon film, polyester film, nylon nonwoven fabrics, polyester glass woven roving, metallic foils, or other thin sheet or roll goods having a melting point above 350° F. In some embodiments, the first exterior layer 240 and the second exterior layer 250 include an intractable material having a melting point greater than 450° F. or an intractable material having no recognized melting point. The intractable surface layers may be attached to the first layer and the third layer by a thermoplastic adhesive, a thermosetting adhesive, or a mechanical fastening system. The intractable surface layers may be attached to the panel using the same thermosetting adhesive as was used to coat the fragments of the first, second, and/or third layers.

In some embodiments, the intractable surface layers are assembled into the mat prior to the hot press event. For example, the intractable surface layers may be coated on the fragment-facing surface with a thermosetting adhesive which is cured as the mat formed of the first layer, the second layer, and the third layer is consolidated into a panel at elevated temperature. In other embodiments, the intractable surface layers are attached to the panel after the layers are consolidated into a panel. For example, the intractable surface layers may be attached to the panel using mechanical fastening means such as bolts, screws, or staples after the layers have been consolidated into a panel. The intractable surface layers may cover the entire surface area of the panel's exterior faces or only a portion of the panel's exterior faces. The intractable surface layers may cover identical or mirror areas of the panel on opposite exterior surfaces of the panel. The intractable surface layers may have a thickness greater than about 0.00001 inches and less than about 0.20 inches. The intractable surface layers may together be about 1-20% of the panel by weight. In some embodiments only one intractable surface layer is attached to the panel.

In some embodiments, the intractable surface layers are not attached to the panel after the panel is formed but are incorporated into the panel as the layers of the mat are being formed. For example, the first, second, and third layers may be formed by placing fragments on top of a first intractable surface layer. A second intractable surface layer may be placed on top of the first, second, and third layers to sandwich the first, second, and third layers between the first and second intractable surface layers. The mat formed of the first, second, and third layers sandwiched between the first and second intractable surface layers may be pressed to consolidate the layers into a panel. In another example, the first, second, and third layers may be formed by dispensing fragments on top of a first intractable surface layer on a conveyor belt. A second intractable surface layer may be placed on top of the first, second, and third layers to form a mat including the first, second, and third layers sandwiched between the first and second intractable surface layers. In this example, the mat including the first, second, and third layers sandwiched between the first and second intractable surface layers may be formed in a continuous sheet or ribbon. The continuous mat may be consolidated into a continuous panel using heat and pressure by continuous hot and cold presses, as discussed herein.

Advantageously, the manufacturing process 400 assembles the mat and consolidates it into a panel in a relatively cold state as compared to conventional methods. This process requires lower energy expenditure and preserves the spatial order of the panel components throughout the process. Preserving the spatial order of the panel components allows the panel to be constructed from multiple layers each having a unique makeup. Each layer can have its own blend of fragments having unique sizes. Each layer can have additional complexity, such as layers of different materials. Building a panel from multiple layers, the properties of which can be fine-tuned results in panels with advantageous mechanical properties. For example, panels built out of layers of material such as discussed herein have higher bond strength, higher bending strength, and higher moduli of elasticity than conventional panels without layers. Additionally, the use of a thermosetting adhesive has the advantage of reducing the time needed to press the panel as compared to conventional panels without thermosetting adhesives. The use of a thermosetting adhesive also advantageously increases bond strength without increasing the thermal expansion coefficient as compared to conventional methods of increasing bond strength in panels. Using a thermosetting adhesive may also have the advantage of increasing the water resistance of the panel. Some thermosetting resins also impart tack to the fragments. Thus, using some thermosetting adhesives may also have the advantage of simplifying the manufacturing process as mats containing a thermosetting adhesive hold together better than mats without a thermosetting adhesive. Fragments are less likely to become detached from a mat having a tacky thermosetting adhesive prior to pressing than from a mat without a tacky thermosetting adhesive. Fragments becoming detached may accumulate on forming boxes, conveyor belts, and/or presses. Fragments that accumulate on presses may ignite if not removed. Thus, using a tacky thermosetting adhesive reduces monitoring and cleaning costs, while increasing the safety of the panel manufacturing process. Additionally, producing panels in a continuous sheet or ribbon has the advantage of greater efficiency and greater uniformity than conventional methods which produce one panel at a time.

FIG. 5 is a table 500 comparing various example panels, in accordance with various embodiments. The table 500 compares various characteristics of example panels 2*c*, 3*a* and 3*b*. Example panel 3*a* was prepared by shredding paper and plastic fragments, drying the fragments, mixing the paper fragments and the plastic fragments to achieve a 70:30 blend of paper fragments and plastic fragments, placing the fragments in a forming box such that the fragment layer was sandwiched between polyethylene film (3.0 mil) in direct contact with the fragments and 42-pound kraft paper in direct contact with the polyethylene film, removing the mat assembly from the forming box, pressing the mat assembly with a hot press with a platen temperature of 400° F. and a constant pressure of 29 psi, and then pressing the fragments with a cold press with a platen temperature of 45° F. and a constant pressure of 17 psi for a period of 300 s, in accordance with one or more embodiments. Samples of the example panel 3*a* were removed and tested to obtain the mechanical properties of the example panel 3*a* shown in the table 500. Example panel 3*b* was prepared in a similar manner to example panel 3*a* except that example panel 3*b* was prepared with the fragments being coated with adhesive. Example panel 2*c* was prepared in similar manner to the example panel 3*a* except that the example panel 2*c* was prepared with a 74:26 blend of paper fragments and plastic fragments. Example panel 2*c* also had two separate thin fragment surface layers (40:60 blend of paper fragments and plastic fragments) and a thick fragment core layer (80:20 blend of paper fragments and plastic fragments), the core layer being coated with an adhesive. Example panel 2*c* was also prepared with a hot press time that was 30 seconds shorter than that of example panels 3*a* and 3*b*.

The table 500 shows that use of an adhesive on the fragments can significantly increase the bending strength and stiffness of the panel (see example panels 3*a* versus 3*b*). Surprisingly, use of adhesive in conjunction with separate fragment layers (see example panel 2*c*) further increased the bending strength and stiffness of the panel, in spite of the reduction in hot press time and adhesive level. The mechanical property improvements associated with example panel 2*c* are unexpectedly large. Classic beam theory teaches us to improve the bending properties of a composite panel (having fixed dimensions) by increasing the modulus of the outer-most layers. This same theory teaches us that increasing the modulus of the inner-most layer of the composite should have a relatively small impact on stiffness. The thermosetting adhesive is only being used in the center-most region of the panel with a layered fragment structure. This center-most layer is sometimes referred to as the neutral axis, because this layer typically does not affect the bending properties of the panel. Thus, these results are surprising and unexpected.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A panel comprising:
a first layer comprising fragments from a first blend of paper fragments of a first size and plastic fragments of a second size;
a second layer comprising fragments from a second blend of paper fragments of a third size and plastic fragments of a fourth size, the third size being different from the first size, and the fourth size being different from the second size; and
a third layer comprising fragments from the first blend,
wherein the second layer is disposed between the first layer and the third layer.

2. The panel of claim 1 wherein the paper and plastic fragments of the first blend and the second blend comprise recycled waste material.

3. The panel of claim 1, wherein each of the first layer and the third layer comprises a thermoplastic binder.

4. The panel of claim 3, wherein the second layer comprises a thermosetting resin.

5. The panel of claim 3, wherein the thermoplastic binder comprises flexible polyvinyl chloride.

6. The panel of claim 3, wherein the thermoplastic binder comprises thermoplastic polyolefin.

7. The panel of claim 1, wherein the second layer comprises a thermosetting resin.

8. The panel of claim 1 wherein the first blend comprises a first paper to plastic ratio and the second blend comprises a second paper to plastic ratio different from the first paper to plastic ratio.

9. The panel of claim 1 further comprising:
a first surface layer on a first outside surface of the panel; and
a second surface layer on a second outside surface of the panel.

10. A panel comprising:
a first layer comprising:
fragments from a first blend of paper fragments of a first size and plastic fragments of a second size; and
a thermoplastic binder comprising at least one of flexible polyvinyl chloride or thermoplastic polyolefin;
a second layer comprising fragments from a second blend of paper fragments of a third size and plastic fragments of a fourth size, the third size being different from the first size, and the fourth size being different from the second size; and
a third layer comprising fragments from the first blend and a thermoplastic binder comprising at least one of flexible polyvinyl chloride or thermoplastic polyolefin,
wherein the second layer is disposed between the first layer and the third layer.

11. The panel of claim 10, wherein the second layer further comprises a thermosetting resin.

* * * * *